(12) United States Patent
Lee et al.

(10) Patent No.: US 7,034,819 B2
(45) Date of Patent: Apr. 25, 2006

(54) APPARATUS AND METHOD FOR GENERATING AN INTERLEAVED STEREO IMAGE

(75) Inventors: Ruen-rone Lee, Hsinchu (TW); Li-shu Lu, Taoyuan (TW); Shih-chin Lin, Taipei (TW)

(73) Assignee: Silicon Integrated Systems Corp., Hsinchu (TW)

( * ) Notice: Subject to any disclaimer, the term of this patent is extended or adjusted under 35 U.S.C. 154(b) by 350 days.

(21) Appl. No.: 10/263,762

(22) Filed: Oct. 4, 2002

(65) Prior Publication Data

US 2004/0066450 A1   Apr. 8, 2004

(51) Int. Cl.
*G06T 15/00* (2006.01)
*G09G 5/00* (2006.01)

(52) U.S. Cl. ....................... 345/419; 345/629
(58) Field of Classification Search ............. 348/51; 382/154; 345/419, 473, 632
See application file for complete search history.

(56) References Cited

U.S. PATENT DOCUMENTS 6,507,358 B1 * 1/2003 Mori et al. ............... 348/42

| | | | |
|---|---|---|---|
| 2001/0005284 A1 * | 6/2001 | Lee et al. | 359/619 |
| 2002/0122585 A1 * | 9/2002 | Swift et al. | 382/154 |
| 2003/0152264 A1 * | 8/2003 | Perkins | 382/154 |

\* cited by examiner

*Primary Examiner*—Michael Razavi
*Assistant Examiner*—Eric Woods
(74) *Attorney, Agent, or Firm*—Birch, Stewart, Kolasch & Birch, LLP

(57) ABSTRACT

An apparatus for generating an interleaved stereo image includes a 3D graphics engine, an interleaved data merger and a register. The 3D graphics engine generates a shrunken left-eye image and a shrunken right-eye image of a stereo image based on video source data, the vertical sizes of the shrunken left-eye image and the shrunken right-eye image are shrunk compared with the vertical size of the video source data. The interleaved data merger stores the shrunken left-eye image and the shrunken right-eye image into two consecutive memory segments, and scans the memory segments while displaying the stereo image. A register controls a line number of a display region, so that the rows of the left-eye image shrunk and the right-eye image shrunk arrive at the display region in line-interleaved order. The invention also discloses a method for generating an interleaved stereo image.

5 Claims, 5 Drawing Sheets

APPARATUS AND METHOD FOR GENERATING AN INTERLEAVED STEREO IMAGE

BACKGROUND OF THE INVENTION

1. Field of the Invention

The invention relates generally to an apparatus and method for generating a stereo image and, more specifically, an interleaved stereo image.

2. Description of the Related Art

Because both eyes can observe the outside objects individually, human beings have stereovision, i.e., the left eye has a left-eye view and the right eye has a right-eye view. In addition, there is a viewing angle difference between both eyes. Then, a stereo image is formed in the brain through the brain's naturally fusing.

A 3D stereo display enables a view's left and right eyes to respectively observe a shrunken left-eye image and a shrunken right-eye image with a viewing angle difference between both eyes, and thus a viewer can see a stereo image. In order to achieve the objective, there is a method that alternatively displays a shrunken left-eye image and a shrunken right-eye image; meanwhile, a viewer wears LCD shutter glasses whose left and right spectacles alternatively allow the lights through with switching operations synchronized with the vertical retrace of the display. Therefore, the viewer can enjoy the sight of stereo images with a high frequency switching level.

Because displaying stereo images requires fast computational capability and large image storage space, many techniques in conventional technology have been developed for speeding up the data computation or reducing the memory space used for displaying stereo images. For example, interlace display technique displays the shrunken left-eye image on the odd lines of the display and displays the shrunken right-eye image on the even lines of the display. Consequently, the data volume of the shrunken left-eye and right-eye images is half reduced.

Referring to FIG. 1, a display 8 with a resolution 10×10 is exemplified. When the interlace display technique is employed, a video memory 1 stores a 10×5 shrunken left-eye image and a 10×5 shrunken right-eye image. A shrunken left-eye image 11 is displayed in lines 1, 3, 5, 7, and 9 of the display and lines 2, 4, 6, 8, and 10 are blank upon displaying the shrunken left-eye image. Similarly, a shrunken right-eye image 12 is displayed in lines 2, 4, 6, 8, and 10 of display image and lines 1, 3, 5, 7, and 9 are blank upon displaying the shrunken right-eye image. There are other implementing practices regarding the interlace display technique, such as line-blanking and sync-doubling, etc.

However, in conventional technologies, the shrunken left-eye and right-eye images need to be processed before displaying a 3D image with the interlace display technique. In order to speedily generate a real-time 3D stereo image, such as sequentially generating each frame of the 3D animation, the problem of slow reaction time causes frame flickering when the interlace display technique is implemented by the software. Therefore, how to increase the speed of the real-time processing of the interlace display technique is desirable to solve.

SUMMARY OF THE INVENTION

In view of the above-mentioned problems, it is an objective of the invention to provide an apparatus and method for generating an interleaved stereo image capable of speeding up the real-time process of an interleaved image and reduce the memory quantity upon displaying a 3D stereo image.

To achieve the above objectives, the invention provides an apparatus for generating an interleaved stereo image, which includes a 3D graphics engine, an interleaved data merger and a register. The 3D graphics engine generates a shrunken left-eye image and a shrunken right-eye image of a stereo image base on the video source data, and the vertical sizes of the shrunken left-eye image and the shrunken right-eye image are shrunk compared with the vertical size of the video source. The interleaved data merger stores the shrunken left-eye image and the shrunken right-eye image in two consecutive memory segments, and scans the memory segments while displaying the stereo image. The register controls a line number of a display region so that the lines of the left-eye image shrunken and the right-eye image shrunk arrive the display region in line-interleaved order.

The vertical sizes of the shrunken left-eye image and the shrunken right-eye image are shrunk to half the vertical sizes of the display region. The horizontal sizes of the shrunken left-eye image and the shrunken right-eye image are the same as the horizontal size of the display region.

The apparatus for generating an interleaved stereo image further comprises a memory device for storing the aforementioned left-eye image and the shrunken right-eye image. The memory device is provided with two frame buffers, one storing the shrunken left-eye image and the shrunken right-eye image currently displaying and the other storing the shrunken left-eye image and the shrunken right-eye image, which are displayed successively. The memory device can be implemented with a dynamic random access memory (DRAM) or a synchronous dynamic random access memory (SDRAM), etc.

The display region is located in a display provided with a micro retarder so that the polarization directions of odd lines and even lines in the display region are different. Therefore, through polarized glasses with different polarization directions of both left and right spectacles, a viewer observes different images with both eyes, i.e. the left eye perceives only the left-eye image and the right eye merely perceives the right-eye image.

According to a method for generating an interleaved stereo image of the invention, a shrunken left-eye image and a shrunken right-eye image of a stereo image are stored in the two consecutive segments after generation. The two consecutive segments are scanned while displaying a stereo image. By controlling a line number of a display region, the method enables the lines of the shrunken left-eye image and the shrunken right-eye image to arrive the display region in line-interleaved order.

A register controlling the line number is reset before scanning the memory segments. The register adds a 1 before one line of the shrunk left-eye image or of the shrunken right-eye image is displayed.

When the memory device is provided with two frame buffers, the method first determines to store the stereo image in either frame buffer. Having finished scanning the memory segments, the method can determine if the switching to the other frame buffer is necessary.

Because the interleaved stereo image display is implemented with the hardware architecture, the invention processes and displays a stereo image by storing the shrunken left-eye image and the shrunken right-eye image in consecutive memory segments. Consequently, the efficiency of image processing and displaying can be improved; meanwhile, the quantity of memory is diminished.

DESCRIPTION OF THE PREFERRED EMBODIMENTS

The apparatus and method for generating an interleaved stereo image in accordance with the preferred embodiments of the invention will be described with reference to the accompanying drawings, wherein the same reference numbers denote the same elements.

Figure 1:
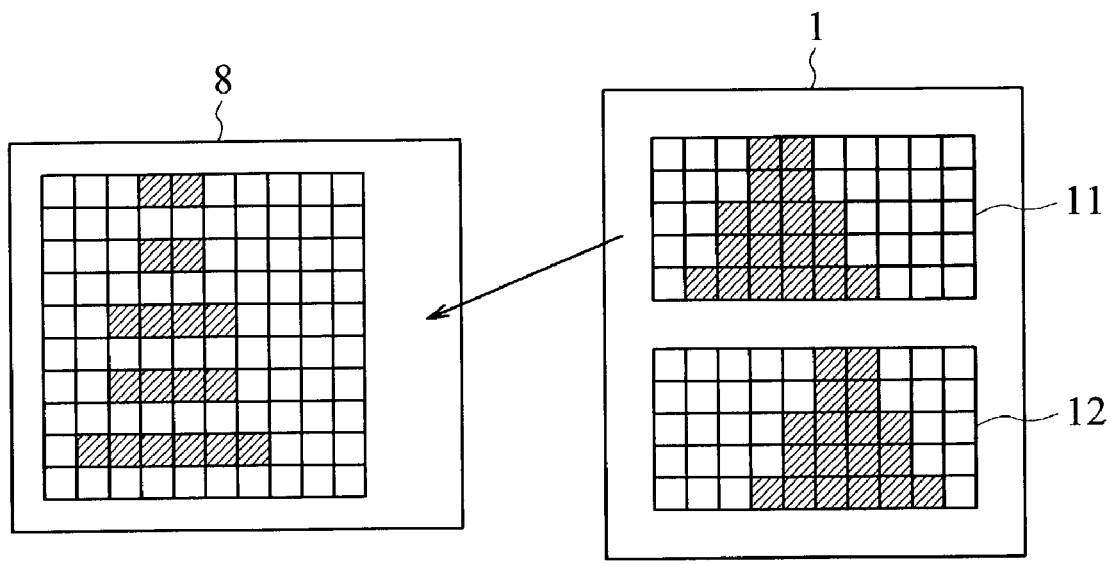
FIG. 1 is a schematic diagram showing an example of using interlace display technique to display a stereo image in prior arts.
Figure 1:
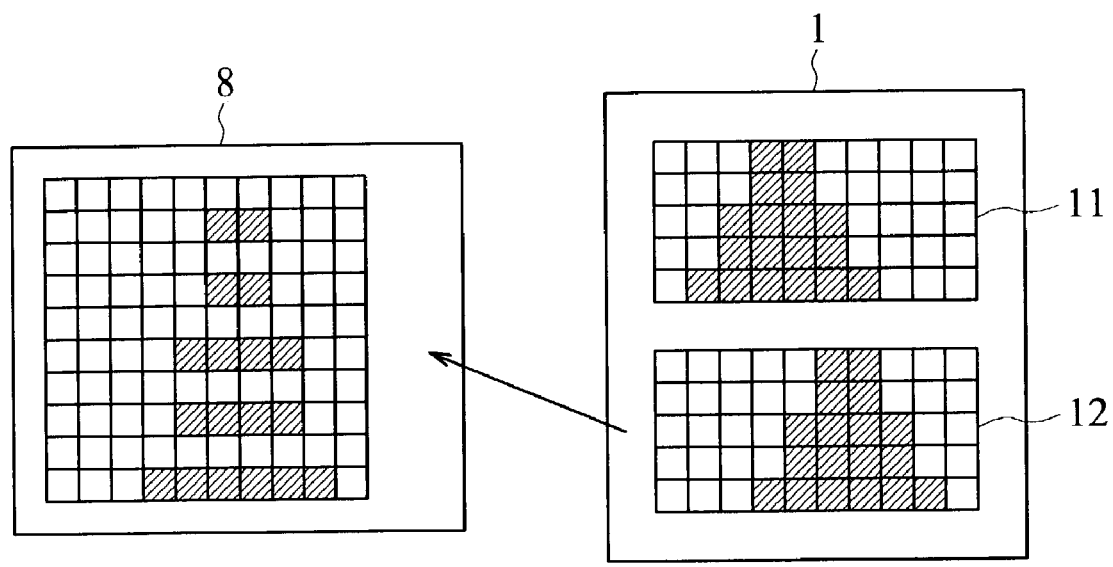
Figure 2:
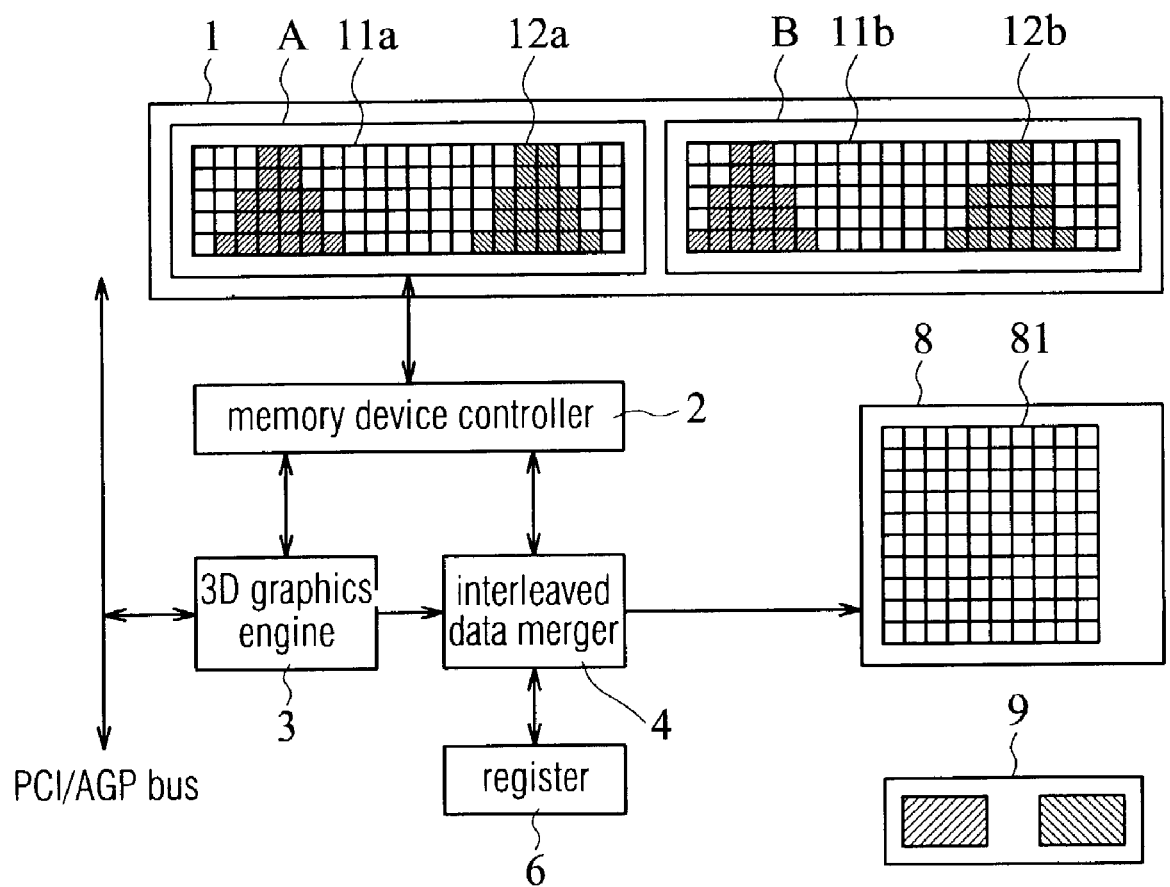
FIG. 2 is a block diagram showing the architecture of the apparatus for generating an interleaved stereo image in accordance with the preferred embodiments of the invention.

Referring to FIG. 2, the apparatus for generating an interleaved stereo image in accordance with the preferred embodiments of the invention implemented in a computer system includes a memory device 1, a memory device controller 2, a 3D graphics engine 3 and an interlaced data merger 4. The apparatus operates in coordination with a display 8 and polarized glasses 9. The Display 8 is equipped with a micro-retarder 81.

The memory device 1 is a device that can store image data, such as a dynamic random access memory (DRAM) and a synchronous DRAM (SDRAM), etc. In the embodiment, the memory device 1 is provided with two frame buffers, i.e. a frame buffer A and a frame buffer B. While a 3D animation is played, the frame buffer A stores a currently showing frame including a shrunken left-eye image 11a and a shrunken right-eye image 12a; also, the frame buffer B stores a ready-prepared frame including a shrunken left-eye image 11b and a shrunken right-eye image 12b.

The memory device controller 2 controls the data access and transfer operations in the memory device 1 as well as receives and interprets the requests from other elements. In addition, the memory device controller 2 also confirms the address where the data are stored so as to read from or write into the memory device.

The 3D graphics engine 3 receives the video source data transferred through buses, and then transforms the video source data into shrunken left-eye and right-eye images with viewing angle differences. The 3D graphics engine 3 is generally a microprocessor provided in graphics card for processing 3D graphics, or is a software or hardware module with similar functions.

In this embodiment, there is a micro-retarder 81 provided in the screen of the display 8, which makes the polarization directions of odd lines and even lines different in the screen of the display. While observing the screen of the display, a viewer wears the polarized glasses 9. Owing to the different polarization directions of left and right spectacles of the polarized glasses 9, a viewer's left eye only receives the odd-line image and the right eye only receives the even-line image. It is noted that the display 8 is a LCD display with a micro-retarder and selects analog or digital input signals according to the specification of the LCD display.

Figure 3:
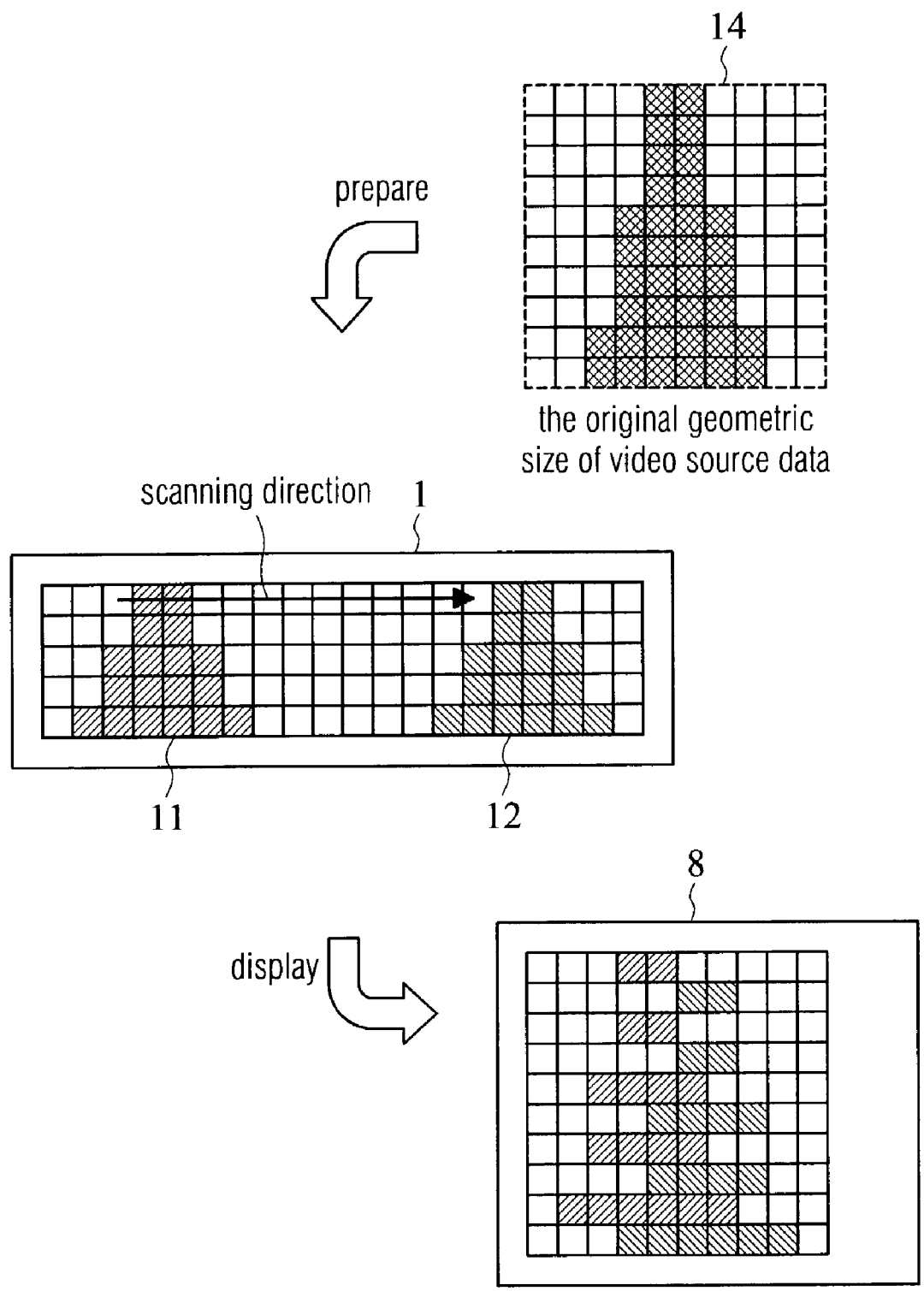
FIG. 3 is a schematic view showing the generating process of the interleaved stereo image according to the preferred embodiments of the invention.

The interlaced data processor 4 stores shrunken left-eye and right-eye images in consecutive memory segments through the memory device controller 2. As shown in FIG. 3, in this embodiment, the vertical sizes of the shrunken left-eye image and the shrunken right-eye image are shrunk to half while a 3D image is generated. Therefore, the vertical sizes of the generated shrunken left-eye image 11 and right-eye image 12 are merely halves of the video source data 14. Interlaced data merger 4 stores the shrunken left-eye image 11 and the shrunken right-eye image 12 in either of two frame buffers in the memory device 1, and simultaneously in two consecutive memory segments.

As images are transferred to the display region of the display 8, the shrunken left-eye image 11 and right-eye image 12 are read out in an interlaced manner because they are stored in two consecutive memory segments. Accordingly, the line 1 of the shrunken left-eye image 11 is scanned first, and then the line 1 of the shrunken right-eye image 12 is also scanned while the line 1 of the frame is scanned. In such a way, when the image data is transferred to the display 8, the line 1 of the display region of the display 8 shows the line 1 of the shrunken left-eye image 11, and line 2 of the display region of the display 8 shows the line 1 of the shrunken right-eye image 12. Similarly, the line 2 of the shrunken left-eye image 11 is scanned first, and then the line 2 of the shrunken right-eye image 12 is also scanned while the line 2 of the frame is scanned. When the image data is transferred to the display 8, the line 3 of the display region of the display 8 shows the line 2 of the shrunken left-eye image 11, and the line 4 of the display region of the display 8 shows the line 2 of the shrunken right-eye image 12.

While a frame buffer is scanned, a register 6 controls a line number where the display 8 currently displays so that the image data with first-in-first-out sequence can be correctly shown in the display 8.

When each line of the frame buffer has been scanned, the display region illustrates the picture as shown in FIG. 3. Odd lines show each line of the shrunken left-eye image 11 while even lines show each line of the shrunken right-eye image 12. As mentioned above, by coordinating the micro-retarder 81 and the polarized glasses 9, the left eye of the viewer only receives the odd-line image and the right eye only receives the even-line image. As a result, the viewer can perceive a 3D image.

Figure 4:
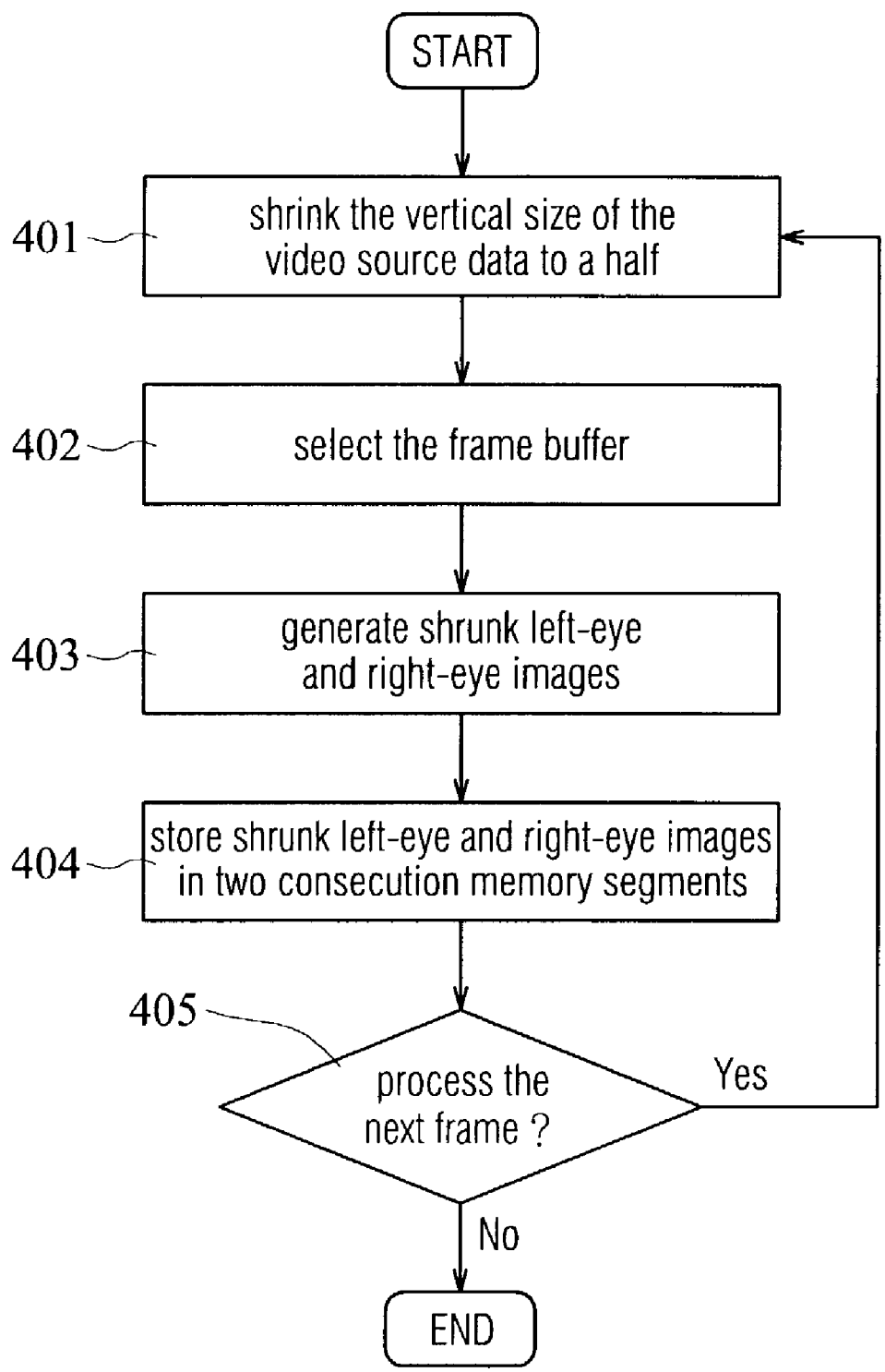
FIG. 4 is a flowchart showing the steps of storing the stereo image in a memory device during the generation of the interleaved stereo image, in accordance with the preferred embodiments of the invention.

Referring to FIG. 4, while the video source data has been received, the 3D graphics engine shrinks the vertical size of the video source data 14 to a half (step 401). Then, a shrunken left-eye image and a shrunken right-eye image are generated according to the geometry information of the video source information (step 403). During the 3D image generation, the vertical size of the video source data 14 is shrunk to a half. Therefore, the shrunken left-eye image and the shrunken right-eye image are shrunk images.

In this embodiment, the frame buffer is a two-buffer architecture. Storing the processing stereo image in either frame buffer is determined before the shrunken left-eye and right-eye images are generated (step 402). For example, if the currently displaying stereo image is output from the frame buffer A, the 3D graphics engine 3 stores the currently processing image data in the frame buffer B. When the image data processing in the frame buffer B is complete, the display 8 immediately outputs the image data in the frame buffer B. Meanwhile, the 3D graphics engine 3 directly stores the currently processing image data in the frame buffer B.

After the frame buffer where stores the stereo image is determined, the currently processing shrunken left-eye and right-eye images are stored in consecutive memory segments in the frame buffer (step 404). Then, after coordinating the refresh speed factor of the display, return to the step 401 if the next frame needs to be processed, or terminate the preparing flow of the frames (step 405).

Figure 5:
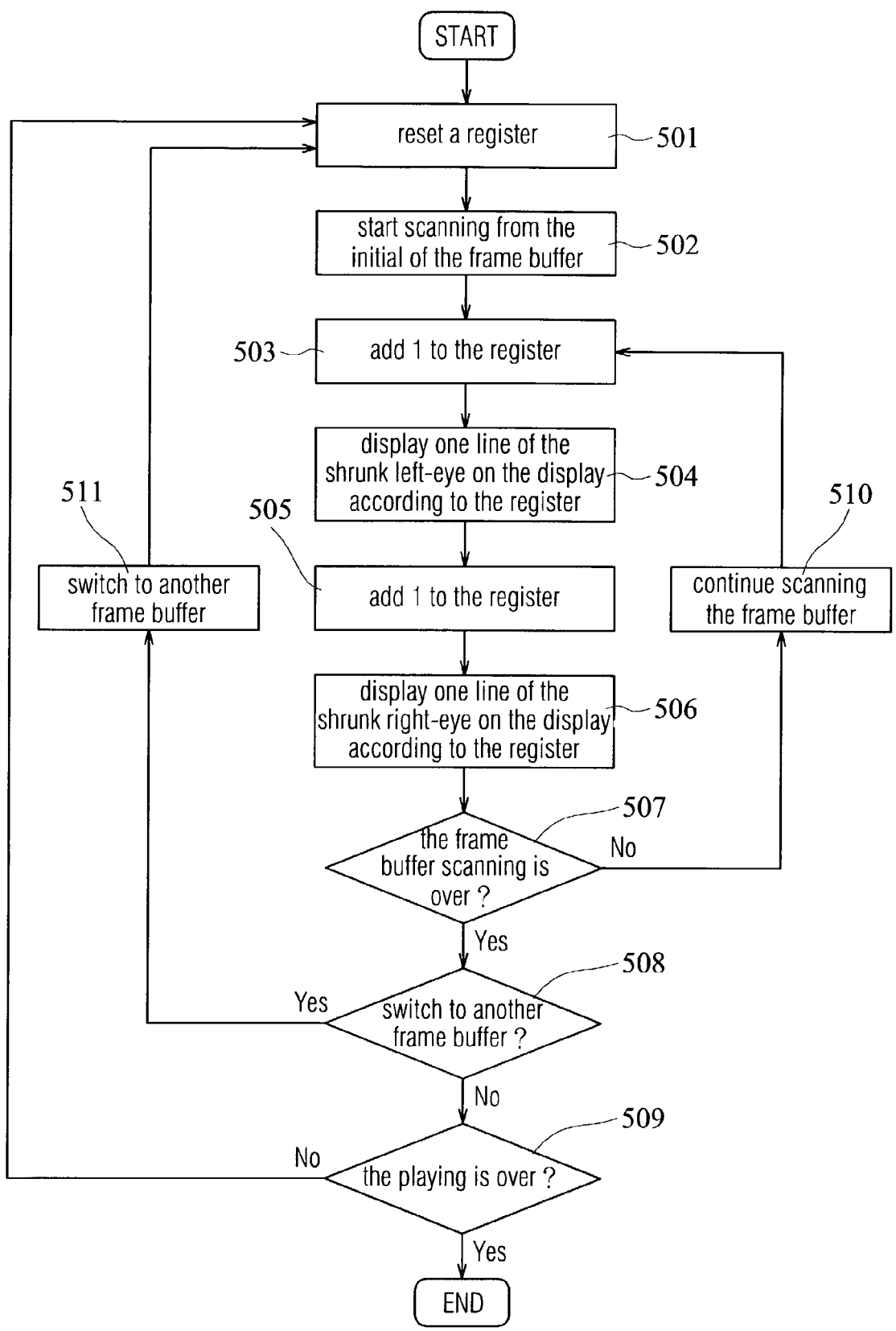
FIG. 5 is a flowchart showing the steps of storing the stereo image in a display during the generation of the interleaved stereo image, in accordance with the preferred embodiments of the invention.

Referring to FIG. 5, the apparatus for generating an interleaved stereo image in accordance with the preferred embodiments of the invention resets the register upon displaying a stereo image (step 501), and then start scanning from the initial position of a frame buffer (step 502). Due to shrunken left-eye and right-eye images of a stereo image stored in consecutive memory segments, the line 1 of the shrunken left-eye image and the line 1 of the shrunken right-eye image are sequentially read out while the line 1 of the frame buffer is scanned. At this time, add 1 to the register (step 503) first to change the digits from 0 to 1. According to the digit in the register, display the line 1 of the shrunken left-eye image on the line 1 of the display (step 504). Then, add 1 to the register (step 505) once more to change the digits from 1 to 2. According to the digit in the register, display the line 1 of the shrunken right-eye image on the line 2 of the display (step 506).

After the line 1 of the frame buffer is scanned, the next line, i.e. the line 2, of the frame buffer continues to be scanned (step 510) because the scanning of the frame buffer is not over (step 507). Further, add 1 to the register again to change the digit in the register from 2 to 3. Accordingly, scanning each line of the frame buffer and controlling the line number in the register where the display has shown display shrunken left-eye and right-eye images displayed on the display in a line-interlaced manner.

If the frame buffer has been scanned, determine whether it needs to be switched to the other frame buffer (step 508). If the shrunken left-eye and right-eye images in the other frame buffer are ready, the switching operation between frame buffers is proceeded (step 511), for example, the initially scanning address pointer of the memory device is pointed to the initial address pointer of the other frame buffer.

If the current frame buffer has been scanned and the switching operation to the other frame buffer is not proceeded by a frame, the software must determine whether or not the image has finished playing and terminate if the reason why the switching operation is not proceeded by a frame is that the data stored in the current frame buffer is the data in the last frame buffer. Or, if the reason why the switching operation is not proceeded by a frame is that the data in the next frame buffer is not ready, the shrunken left-eye and right-eye images are redisplayed on the display.

According to the embodiment, the above-mentioned flows both in FIG. 4 and FIG. 5 may proceed simultaneously to playing multiple frames, for example, playing the animation.

The method for generating an interleaved stereo image disclosed in the embodiment simultaneously arranges the stereo image data in a frame buffer and displays the image data of the other frame buffer to the display. Consequently, speed the image processing and diminish the possibility of image retarding upon playing the animation.

It is noted that many alternatives, modifications and variations will be apparent to those skilled in the art in light of the foregoing description without departing from the spirit and scope of the invention. For example, the invention provides the method for generating an interleaved stereo image that can also be implemented in TV sets, video game players or any electric appliances equipped with the image displaying function. In addition, in the aforementioned embodiment, the memory device possesses a two-buffer architecture. However, those skilled in the art may use other buffer architectures, for example, single frame buffer, to display the stereo image.

The above-described embodiment should be considered in all respects as illustrative and not restrictive. Any modifications and changes made to the invention should be included in the appended claims without departing from the spirit and scope of the invention as set forth in the appended claims.

What is claimed is:

1. A computer-implemented method for generating an interleaved stereo image comprising:
  generating a shrunken left-eye image and a shrunken right-eye image of a stereo image based on video source data, wherein the vertical sizes of the shrunken left-eye image and the shrunken right-eye image are shrunk compared with the vertical size of the video source data;
  storing the shrunken left-eye image and the shrunk right-eye image in two consecutive memory segments in a memory device; and
  scanning the memory segments, and enabling the lines of the left-eye image shrunk and the right-eye image shrunk to arrive at the display region in line-interleaved order by controlling a line number of a display region including, resetting a register, which controls the line number, before scanning the memory segments; and
  adding 1 to the register before displaying one line of the shrunken left-eye image or the shrunken right-eye image.

2. The method recited in claim 1, wherein the vertical sizes of the shrunken left-eye image and the shrunken right-eye image are shrunk to half the vertical size of the display region.

3. The method recited in claim 1, wherein the horizontal sizes of the shrunk left-eye image and the shrunk right-eye image are the same as the horizontal size of the display region.

4. The method recited in claim 1, wherein the memory device comprises two frame buffers and the consecutive segments are located in one of the frame buffers and the method further comprises:
  determining which one of the frame buffers the currently processing stereo image is going to be stored in.

5. The method recited in claim 1, wherein the memory device comprises two frame buffers, and the consecutive segments are located in one of the frame buffers and the method further comprises:
  determining whether switching to the other frame buffer is required after the memory segments have been scanned.

* * * * *